(12) United States Patent
Shou et al.

(10) Patent No.: US 8,081,879 B2
(45) Date of Patent: Dec. 20, 2011

(54) SYSTEM FOR DYNAMICALLY OPTIMIZING A DECISION THRESHOLD VOLTAGE IN AN OPTICAL TRANSPONDER

(75) Inventors: Xiaoqiang Shou, Westford, MA (US); Kevin Cheng, Newbury Park, CA (US); Ruai Yu, Newbury Park, CA (US)

(73) Assignee: Gtran Corporation, Camarillo, CA (US)

( * ) Notice: Subject to any disclaimer, the term of this patent is extended or adjusted under 35 U.S.C. 154(b) by 558 days.

(21) Appl. No.: 12/353,171

(22) Filed: Jan. 13, 2009

(65) Prior Publication Data
US 2010/0178059 A1    Jul. 15, 2010

(51) Int. Cl.
*H04B 10/00*    (2006.01)
(52) U.S. Cl. .............. 398/136; 398/30; 398/32; 398/33; 398/93
(58) Field of Classification Search .................... 398/30, 398/32–33, 136
See application file for complete search history.

(56) References Cited

U.S. PATENT DOCUMENTS

| 6,243,441 B1* | 6/2001 | Zur ............................. 378/98.8 |
| 2006/0075147 A1* | 4/2006 | Schoinas et al. .................. 710/3 |
| 2007/0079054 A1* | 4/2007 | Rudelic ........................ 711/103 |

* cited by examiner

*Primary Examiner* — Dung Nguyen
(74) *Attorney, Agent, or Firm* — GSS Law Group

(57) ABSTRACT

A transponder having a dynamic remapping circuit remaps a value of decision threshold voltage Vdtc and a value of optical power RXP to a reference voltage Vref to minimize the bit error rate BER of a communication system. The dynamic remapping circuit implements a bilinear mapping of Vdtc and RXP to Vref with three bilinear remapping constants "a", "b", and "c" selected to align a remapped value of Vdtc_opt to a selected Vdtc normalization value, Vdtc_norm. A transponder in accord with an embodiment of the invention prevents BER from exceeding a threshold value of BER whether RXP or OSNR, or both, remain constant, change continuously, or change intermittently. Constants "a", "b", and "c" are related to parameters resulting from mathematically fitting a line to data comprising Vdtc_opt versus RXP. Another embodiment comprises a method for dynamically optimizing Vdtc and RXP to Vref in a transponder with a bilinear remapping circuit.

16 Claims, 9 Drawing Sheets

PRIOR ART

| | |
|---|---|
| A | Low OSNR, High Power |
| B | Low OSNR, Low Power |
| C | High OSNR, Low Power |
| D | High OSNR, High Power |

SYSTEM FOR DYNAMICALLY OPTIMIZING A DECISION THRESHOLD VOLTAGE IN AN OPTICAL TRANSPONDER

FIELD OF THE INVENTION

The present invention relates to an optical transponder adapted to minimize a value of bit error rate in data recovered from an optical data signal transmitted through a fiber optic network.

BACKGROUND

A modulated optical data signal in a fiber optic communication network is subject to degradation as the signal passes through an optical fiber from an optical transponder at a data source to another optical transponder at a data destination. Attenuation and dispersion are two forms of degradation known to affect optical data signals. Attenuation refers to a form of signal degradation in which some of the light injected into an optical fiber by a source transponder does not arrive at a destination transponder. A measurement of attenuation from the optical fiber may be made by, for example, making a measurement of the optical power of an optical data signal at an input to the optical fiber, making another measurement of optical power at an output from the optical fiber, and comparing the two optical power measurements. Dispersion refers to a form of signal degradation in which an optical pulse detected by a receiver has been distorted by its passage through the fiber optic communication network into a broader, more rounded shape compared to the shape the pulse had when it was output from a transmitter. Undesirable effects of dispersion include uncertainty in measurements related to time, for example, uncertainty in synchronizing an optical pulse representing digital data with a clock signal in a receiver circuit, and uncertainty in determining the time when a signal changes from one logical state (e.g., "true" or "1") to the opposite state (e.g., "false" or "0").

Equipment in the signal path between the source transponder and the destination transponder further degrades the optical data signal by adding noise to the signal. There are many potential noise sources, for example noise from adjacent channels in Wavelength Division Multiplexing (WDM) systems, noise from attenuators used to equalize power among adjacent channels in Dense Wavelength Division Multiplexing (DWDM) systems, and noise from amplifiers. An amplifier not only introduces its own noise into the optical data signal, for example amplifier spontaneous emission noise, it also amplifies any noise already present in the optical data signal. Each additional stage of amplification between the source transponder and destination transponder may therefore increase the difficulty of recovering data from the optical data signal.

Noise accumulates in the optical data signal as the signal travels from a source transponder to a destination transponder. A measurement of noise referred to as an optical signal to noise ratio (OSNR) represents a ratio between the amplitude of a desired portion of an optical data signal, the desired portion corresponding to data to be transmitted over a fiber optic network, and the amplitude of noise in the optical data signal. In general, data may be recovered with fewer communication errors, that is, fewer differences between transmitted data and received data, from an optical data signal having a high OSNR value than from one with a low OSNR value. At a sufficiently low value of OSNR, the communication system may be unable to recover transmitted data from an optical data signal.

A measurement of communications system reliability referred to as the bit error rate (BER) expresses a ratio between the number of differences between transmitted bits and received bits and the total number of transmitted bits. A low BER is more desirable than a high BER. A mathematical relationship is known between BER and OSNR in which a low BER value corresponds to a high OSNR value and a high BER value, that is, a relatively large number of differences between transmitted and received bits, corresponds to a low OSNR value. Communication systems increase system reliability by minimizing BER.

A communication system may attempt to minimize BER by adjusting a numerical value for a transponder parameter referred to as a decision threshold voltage (Vdtc). A transponder compares a reference voltage Vref, where Vref is related to Vdtc, to an amplitude of an incoming optical data signal to determine if the optical data signal at the time of comparison has an amplitude representative of a logical "1" or a logical "0". For each selected value of Vdtc there is a corresponding reference voltage Vref and a corresponding measured value of BER. An optimal value of Vdtc, referred to as Vdtc_opt, corresponds to a minimum value of BER. Some communication systems known in the art use a Vdtc adaptive search algorithm to find a value of Vdtc corresponding to Vdtc_opt, further corresponding to a minimum value of BER.

A mathematical relationship between Vdtc and BER may be illustrated by plotting a curve comprising (Vdtc, BER) data pairs at a selected combination of values for input signal optical power RXP and OSNR. Furthermore, a family of related curves may be plotted to show BER as a function of Vdtc for more than one pair of values of RXP and OSNR. FIG. 11 shows an example of a family of four related curves for measurements made on a communication system known in the art. Each curve in FIG. 11 is a plot of measured BER values as a function of Vdtc for a pair of values of RXP and OSNR measured from an optical data signal.

In the prior art illustration of FIG. 11, curve A is related to an optical signal having low OSNR and high RXP, curve B is related to an optical signal having low OSNR and low RXP, curve C is related to an optical signal having high OSNR and low RXP, and curve D is related to an optical signal having high OSNR and high RXP. On each curve there is a value of Vdtc corresponding to a minimum value of BER, as indicated by dashed lines in FIG. 11. Vdtc corresponding to minimum BER for curve A is labeled Vdtc_optA, Vdtc corresponding to minimum BER for curve B is labeled Vdtc_optB, and so on. Note that in the example of data from a prior art communications system shown in FIG. 11, Vdtc_optB and Vdtc_optC have approximately the same value (about 0.42 on the Vdtc axis). Vdtc_optB and Vdtc_optC may have different values for data collected from another transponder or for data collected under another combination of OSNR and optical power.

A Vdtc search algorithm running in a communication system would be expected to find a value of Vdtc corresponding to Vdtc_optB for an optical signal having low RXP and low OSNR. The Vdtc search algorithm would similarly be expected to find the other labeled Vdtc_opt points under the conditions of RXP and OSNR applying to each of the remaining curves in FIG. 11. However, for communication systems known in the art, a Vdtc search algorithm may not converge to a minimum value of Vdtc if BER is greater than a BER threshold value during the search. For example, a Vdtc search algorithm operating in some communications systems known in the art will be unable to converge to a Vdtc result for a BER greater than a BER threshold value of 0.001. A BER threshold value of $10^{-3}$ (0.001) is labeled in FIG. 11.

After a Vdtc search algorithm converges on a numerical value of Vdtc corresponding to Vdtc_opt for a particular set of OSNR and RXP values, a reference voltage Vref having an amplitude related to the numerical value of Vdtc is determined. A reference voltage Vref related to a decision threshold voltage Vdtc corresponding to Vdtc_opt is referred to as Vref_opt. In communication systems known in the art, a determination of a value for Vref from a value of Vdtc, also referred to as mapping Vdtc to Vref, is made using a linear relationship between Vdtc and Vref. A linear mapping may be accomplished by relating Vref to Vdtc with the linear relationship expressed in equation (1):

$$V\text{ref}=(c1 \times V dtc)+c2 \tag{1}$$

where c1 and c2 are mathematical constants and c2 is added to the product of c1 and Vdtc to determine a value of Vref.

In the absence of signal degradation, Vdtc would be expected to have a value corresponding to halfway between an optical data signal amplitude representing a logical "1" and an optical data signal amplitude representing a logical "0". However, a search algorithm for Vdtc may take into account a well known observation that noise generally affects the "on" state of an optical data signal more than the "off" state of the signal. The resulting value of Vdtc may therefore be less than halfway between the optical data signal amplitude representing a logical "1" and the optical data signal amplitude representing a logical "0".

A Vdtc search algorithm in a communication system known in the art would be expected to converge to an optimum value of Vdtc for an optical data signal having stable OSNR and RXP as long as BER is less than the BER threshold value. A Vdtc search algorithm may fail to converge when BER is greater than the BER threshold value. When the measured values of RXP and OSNR of an optical data signal change, a related value of Vdtc_opt also changes. Communication systems known in the art may be unable to find Vdtc corresponding to Vdtc_opt for rapid or large changes in OSNR and RXP, at least in part due to their use of linear mapping as in equation (1). Linear mapping in communication systems known in the art is known to have at least two important shortcomings. For example, individual Vdtc_opt values corresponding to different combinations of RXP and OSNR measured from an optical data signal may be misaligned, that is, a Vdtc_opt value for one combination of OSNR and RXP may be substantially different from a Vdtc_opt value for a different combination of RXP and OSNR. A misalignment of Vdtc_opt points is illustrated in the prior art example of FIG. 11, wherein Vdtc_optA, Vdtc_optB, and Vdtc_optD have substantially different values along the Vdtc axis.

Another shortcoming of linear mapping is that BER is especially sensitive to Vdtc values computed for an optical data signal having low optical power. That is, at low optical power, a relatively small change in Vdtc can cause a relatively large change in BER. As shown in FIG. 11, a sensitivity of BER to changes in Vdtc is related to a span of each curve, where a span of a curve is defined as a difference in Vdtc values for two points on the curve at a selected value of BER. For example, in FIG. 11, Vdtc_optA has a much larger span than Vdtc_optB or Vdtc_optC at the same BER threshold value, and the span of Vdtc_optD is greater than the span of Vdtc_optA. In FIG. 11, BER has less sensitivity to a change in Vdtc on curves A and D, the curves related to an optical signal with high optical power, than for curves B and C, the curves related to an optical signal with low optical power. In general, a curve with a narrow span will have higher sensitivity of BER to Vdtc than a curve with a wider span.

A misalignment of Vdtc_opt values is undesirable in part because communication systems known in the art are limited by the use of linear mapping to adjust Vdtc along a continuous transitional path between a previous Vdtc_opt value and a new Vdtc_opt value resulting from a change in OSNR, a change in RXP, or changes in both OSNR and RXP. A misalignment between old and new Vdtc_opt values may cause a Vdtc search algorithm to converge slowly or to fail to converge. For example, a prior art communication system responding to a change in OSNR or optical power may seek Vdtc along a transitional path between misaligned old and new Vdtc_opt values on which BER increases or even exceeds the BER threshold value, in which case the Vdtc search algorithm fails to converge.

A transition between old and new Vdtc_opt values is more likely to cause a Vdtc search algorithm to fail when a change in the optical data signal is large, the change occurs over a relatively short time duration, or the old and new Vdtc_opt values are widely separated. In the context of determining a decision threshold voltage Vdtc and its related reference voltage Vref, a relatively short time duration refers to a time duration that is less than an amount of time needed for a Vdtc search algorithm to converge to a new value of Vdtc. One can appreciate that a Vdtc search algorithm will output non-optimal values of Vdtc, and the transponder will accordingly use a non-optimal value of Vref to recover data from an optical data signal, if the algorithm takes longer to converge than an amount of time in which OSNR or RXP change enough to make a previous value of Vdtc non-optimal. For example, a change in an optical data signal from a high value of RXP and a high value of OSNR to a low value of RXP and a low value of OSNR may cause a Vdtc search algorithm to fail before a communication system can settle into a new Vdtc corresponding to a new Vdtc_opt. In the example of measurements from a prior art communication system in FIG. 11, a change in an optical data signal from high OSNR and high RXP, for which a Vdtc search algorithm is expected to locate Vdtc equal to Vdtc_optD, to low OSNR and low RXP, will cause Vdtc to change to a value for which BER is greater than the BER threshold value before Vdtc reaches Vdtc_optB. When BER exceeds the BER threshold value, the Vdtc search algorithm fails to converge to a new Vdtc corresponding to Vdtc_opt and fails to update the transponder with a new optimum value of Vdtc corresponding to the new optical signal conditions. The transponder will therefore use a non-optimal value of Vref (i.e., a value determined for a previous set of optical data signal parameters) to recover data from the optical signal and BER will increase.

FIG. 11 further illustrates how a magnitude of change in an optical data signal in a communication system known in the art may be characterized by a corresponding effect on a calculated value of BER. For example, a relatively large magnitude of change in a value of OSNR, such as a change from a high value of OSNR to a low value or a change from a low value to a high value, is a change large enough to cause a value of BER to exceed a BER threshold value. A relatively large magnitude of change in a value of RXP for an optical data signal similarly causes a value of BER to exceed a BER threshold value.

Vdtc search algorithm failures may occur in a prior art communication system when the system is started up, although failures may also occur after start-up since large, rapid changes in OSNR and optical power are known to occur in optical data signals. What is needed is a system having means for dynamically mapping a value of Vref from values for Vdtc and optical power. What is further needed is a system that adjusts Vdtc to improve the efficiency of subsequent searches for optimal values of Vdtc after changes in optical signal power and OSNR.

SUMMARY

Embodiments of the invention comprise a transponder having a dynamic remapping circuit for optimally remapping a value for decision threshold voltage Vdtc to a reference voltage Vref in order to achieve a minimum value of BER for an optical data signal undergoing changes in OSNR or RXP. Several alternative refinements of a dynamic remapping circuit are provided, each including a bilinear remapping circuit and a digital to analog converter (DAC). The bilinear remapping circuit implements a bilinear mapping of Vdtc and RXP to Vref and uses the values of three bilinear remapping constants "a", "b", and "c" to normalize different Vdtc_opt points corresponding to optical data signals having different values of OSNR and optical power to a selected Vdtc normalization value Vdtc_norm.

The bilinear remapping circuit optionally includes a device for executing software instructions for remapping such as a microprocessor, a microcontroller, a digital signal processor (DSP), a gate array, a programmable logic device (PLD), or an application-specific integrated circuit (ASIC). A bilinear remapping circuit may further optionally include a memory device electrically connected to the device for executing software instructions or a memory area that is part of the device for executing software instructions. Or, a bilinear remapping circuit may optionally comprise dedicated mapping logic for performing a remapping without a device for executing software instructions.

Bilinear remapping constants "a", "b", and "c" are determined from measurements of BER versus Vref for optical data signals having different OSNR and RXP values. For each selected value of RXP, two values of Vref_opt corresponding to a lowest BER are measured, one value at low OSNR and one value at high OSNR. The constants "a", "b", and "c" are related to parameters for a line resulting from a linear curve fit to the data set comprising Vref_opt pairs at various values of RXP. The bilinear remapping constants are retained in storage locations in the transponder and are accessed by the bilinear remapping circuit to perform a remapping of Vdtc and RXP to Vref.

Bilinear remapping constants "a", "b", and "c" are selected to facilitate rapid convergence of a Vdtc search algorithm operating in the communication system and to limit BER to a value less than or equal to a BER threshold value, above which a Vdtc search algorithm in the communications management system may fail to converge. Constant "a" affects the alignment of Vdtc_opt points corresponding to minimum values of BER, for various OSNR and RXP values. Constant "b" affects a sensitivity of BER to changes in Vdtc and facilitates searching for an optimal value of Vdtc when the optical data signal power RXP is small. Constant "c" affects alignment of Vdtc_opt points relative to a selected normalization value of Vdtc, Vdtc_norm.

This section summarizes some features of the present embodiment. These and other features, aspects, and advantages of the embodiments of the invention will become better understood with regard to the following description and upon reference to the following drawings, wherein:

BRIEF DESCRIPTION OF THE DRAWINGS

FIG. 11 further illustrates values of Vdtc_opt which are not aligned in the direction of the Vdtc axis, i.e., non-normalized Vdtc_opt values. (PRIOR ART)

FIG. 12 further illustrates an example of normalized Vdtc_opt values resulting from operation of an embodiment of the invention.

DESCRIPTION

Embodiments of the invention comprise an optical transponder having a dynamic remapping circuit for mapping a value for a decision threshold voltage (Vdtc) input from an external source such as a communications management system to a corresponding reference voltage (Vref) used by the transponder to recover digital data from an optical data signal undergoing intermittent or continuous changes in optical power RXP or optical signal to noise ratio OSNR. The dynamic remapping circuit includes a DAC and a bilinear remapping circuit for performing a bilinear mapping according to a selected mathematical relationship between Vdtc, RXP, and bilinear remapping constants "a", "b", and "c" having values selected to minimize BER in a communications system.

Benefits of the embodiments described herein include rapid convergence of a Vdtc search algorithm running in a communications management system electrically connected to an embodiment, fewer instances of a Vdtc search algorithm failing to converge, scaling and offsetting of Vdtc_opt points to cause Vdtc_opt points to be approximately aligned to a selected Vdtc normalization value Vdtc_norm, reduction of an offset voltage output from a decision circuit in an embodiment, and reduced sensitivity of BER to changes in Vdtc. Further benefits include optimization of Vref following a large or rapid change in the OSNR or RXP of an optical data signal, reduced BER, and operation near an optimally low value of BER under changing conditions of RXP and OSNR. Furthermore, some embodiments are suitable for retrofitting to a transponder which was previously not adapted for bilinear remapping of Vdtc and RXP to Vref.

Figure 1:
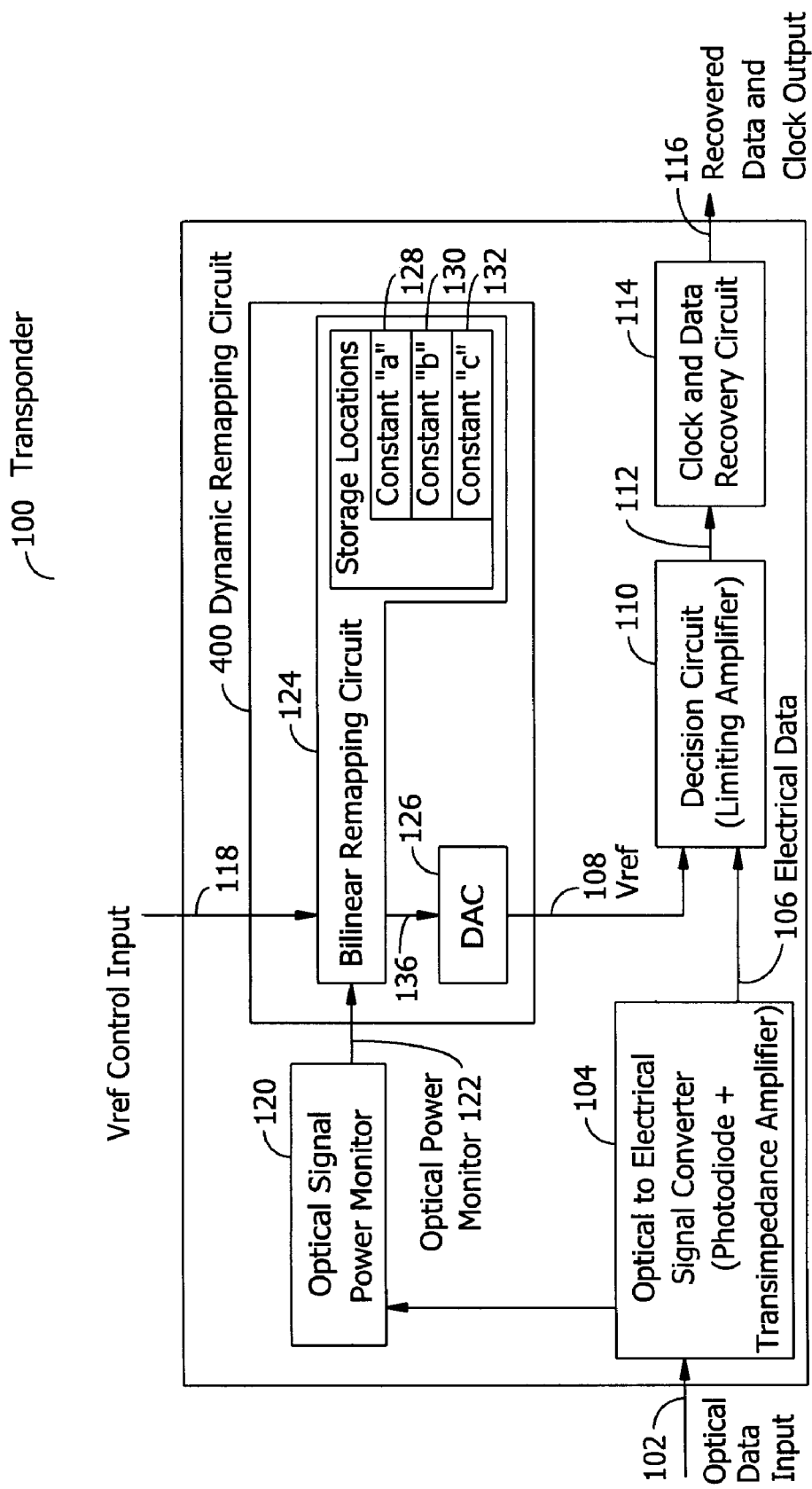
FIG. 1 is a simplified block diagram of the receiver portion of a transponder in accord with an embodiment of the invention.

FIG. 1 shows a simplified block diagram of the receiver portion of a transponder 100 in accord with an embodiment of the invention. The design and operation of the transmitter portion of a transponder will be known by one skilled in the art and will therefore not be described herein. An optical data signal on an optical data input line 102 is input to the transponder 100 and passes through an optical to electrical signal converter 104 comprising a photodiode and a transimpedance amplifier. An optical signal power monitor 120 makes measurements related to the optical power of the optical data signal, for example by measuring average current flowing in the photodiode in the optical to electrical signal converter 104, and outputs a value of RXP on an optical power monitor line 122 which is electrically connected to an input of a dynamic remapping circuit 400. The optical to electrical signal converter 104 outputs on an electrical data line 106 an electrical signal corresponding to data and noise in the optical data signal on the optical data input line 102.

The dynamic remapping circuit 400 receives a value of Vdtc on a Vref control input line 118 electrically connected from an input of the transponder 100 to an input of a bilinear remapping circuit 124 within the dynamic remapping circuit 400. The bilinear remapping circuit 124 outputs a digital electrical signal corresponding to a remapped value of decision threshold voltage on a line 136 electrically connected to an input of a DAC, which may alternatively be a separate device as shown for the DAC 126 in FIG. 1 or may be included as part of another device in the bilinear remapping circuit as in examples to follow. The DAC converts the digital electrical signal on its input line 136 to an analog reference voltage Vref and outputs Vref on a reference voltage line 108 which is electrically connected from an output of the DAC to an input of a decision circuit 110.

The decision circuit 110 includes a limiting amplifier for comparing the amplitude of the electrical data signal on the electrical data line 106 to Vref on the reference voltage line 108 to determine if the amplitude of the electrical data signal at a selected time is representative of a logical "1" or a logical "0". For example, in the case of an input optical data signal comprising 40 gigabit/sec data pulses, the decision circuit 110 compares Vref on the reference voltage line 108 to the electrical data signal on the electrical data line 106 at least once every 0.025 nanosecond. The decision circuit 110 outputs a signal representative of a logical "1" for an electrical data signal amplitude greater than or equal to Vref and a signal representative of a logical "0" for an electrical data signal amplitude less than Vref. An output of the decision circuit 110 on a decision circuit output line 112 is an electrical signal comprising values related to data with time uncertainty, for example time uncertainty in the form of jitter. The electrical signal on the decision circuit output line 112 is representative of an optical data signal degraded by passage through a fiber optic communication system as received by the transponder 100. The signal on the decision circuit output line 112 is input to a clock and data recovery circuit 114, which recovers data and a clock signal and outputs the clock and recovered data as digital electrical signals on a clock and data output line 116.

Figure 2:
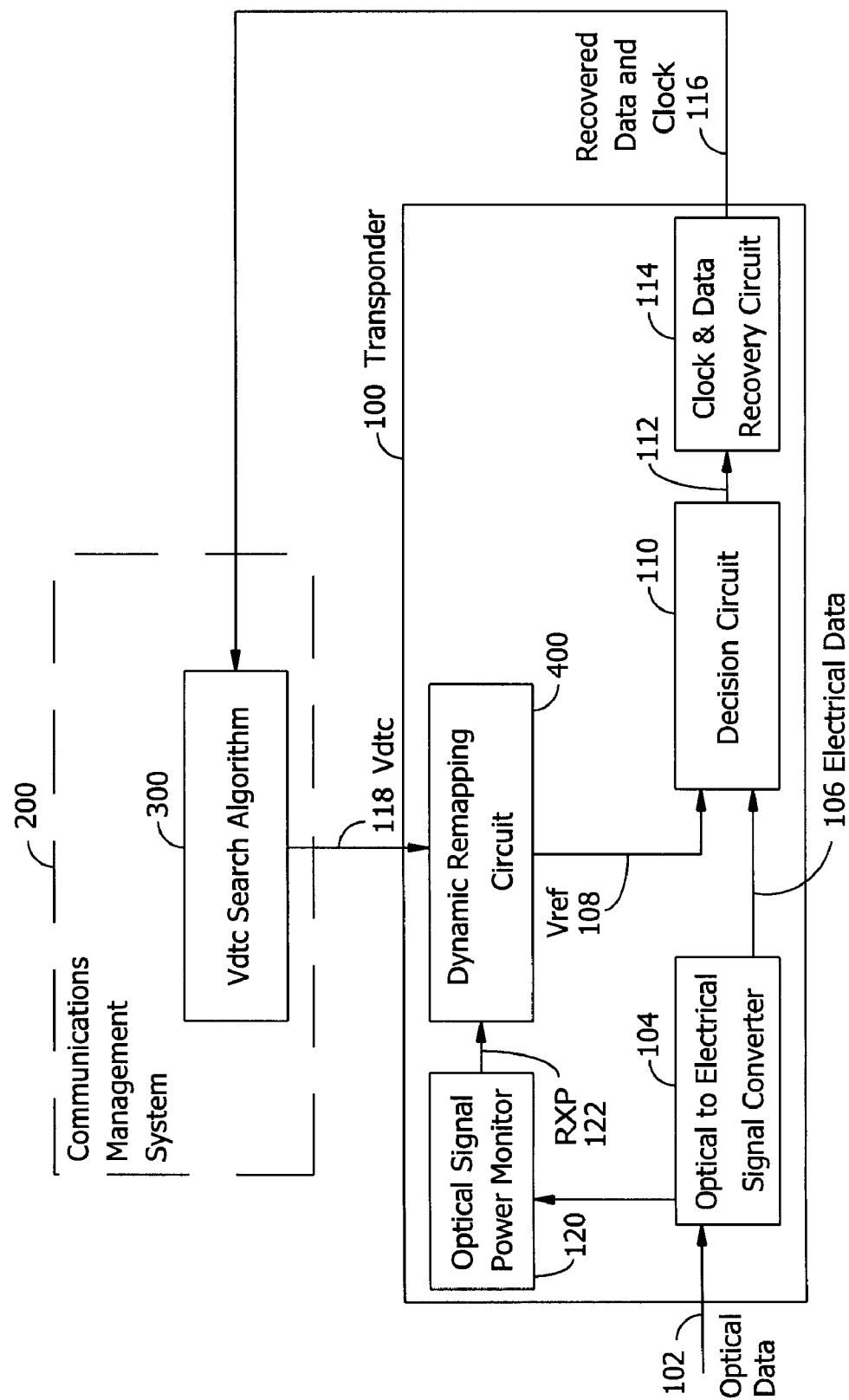
FIG. 2 shows an example of signals exchanged between the transponder example of FIG. 1 and an external communications management system having a system for executing a Vdtc search algorithm.

A fiber optic communication system includes at least one data source and at least one data destination interconnected by fiber optic cables. A data source and a data destination may each comprise a transponder in accord with an embodiment of the invention. During operation in a fiber optic communication system, the transponder 100 is electrically connected to a communications management system, as shown in the example of FIG. 2. In some communication systems, a communications management system 200 may optionally be electrically connected to more than one transponder 100. The communications management system 200 in FIG. 2 is not part of an embodiment of the invention, but is illustrated as an example of a source for a value of Vdtc to be remapped by an embodiment. The communications management system 200 may also manage communications with other equipment, for example equipment which receives data recovered by the transponder 100 from the optical data signal on the transponder optical data input line 102.

As shown in FIG. 2, a clock and data output line 116 is electrically connected from the transponder 100 to an input of a device for performing a Vdtc search algorithm 300 in the communications management system 200. The Vdtc search algorithm 300 attempts to find an optimum value of Vdtc, referred to as Vdtc_opt, corresponding to a minimum value of bit error rate BER. A value of Vdtc_opt may optionally be determined by the Vdtc search algorithm 300 for each new combination of optical signal to noise ratio and optical signal power values (OSNR, RXP) measured from an optical data signal at different selected times. The Vdtc search algorithm 300 outputs a numerical value of Vdtc corresponding to Vdtc_opt on the Vref control input line 118 to the transponder 100.

A numerical value of Vdtc received by the transponder 100 is input to a dynamic remapping circuit 400 as in FIG. 1 and FIG. 2. A value of Vref corresponding to a value of Vdtc representing Vdtc_opt is referred to as Vref_opt. During operation in a fiber optic communication network, the transponder 100 receives a numerical value of Vdtc from, for example, a Vdtc search algorithm running in a communications management system, and maps the value of Vdtc to an analog voltage Vref. Vref is then used by the transponder 100 to recover data from an optical data signal as previously described. A value of Vref_opt is related to a minimum value of BER and corresponds to an optimized value of decision threshold voltage, Vdtc_opt. A successful search from the Vdtc search algorithm is therefore a search which finds a Vdtc value leading to operation at a minimum value of BER, corresponding to a search which locates a value of Vdtc_opt and thus leads to a related value for Vref_opt. Preferred embodiments of a dynamic remapping circuit 400 complete a remapping of Vdtc and RXP to Vref in an amount of time that is less than a time interval over which changes in RXP and OSNR large enough to require a new Vdtc value are likely to occur.

The dynamic remapping circuit 400 in the transponder 100 example of FIG. 1 and FIG. 2 comprises a hardware portion and an optional software portion adapted for execution by the hardware portion. In some embodiments, a firmware portion is included. In other embodiments, a firmware portion replaces a software portion. Alternative embodiments for a dynamic remapping circuit are shown in FIGS. 3-7. Each of the alternative embodiments for a dynamic remapping circuit 400 in FIGS. 3-7 comprises a Vref control input line 118 for receiving a value of Vdtc, an optical power monitor line 122 for receiving a value of optical signal power RXP, and reference voltage line 108 on which the reference voltage Vref is carried to an input of the decision circuit in the transponder.

Figure 3:
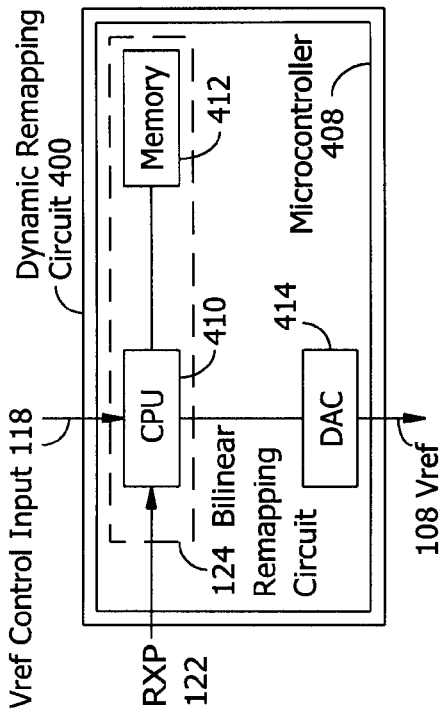
FIG. 3 is a block diagram of an example of a dynamic remapping circuit in an embodiment of the invention, for example the transponder of FIG. 1. The dynamic remapping circuit in FIG. 3 includes a DAC and a bilinear remapping circuit comprising a microprocessor and a memory device.
Figure 4:
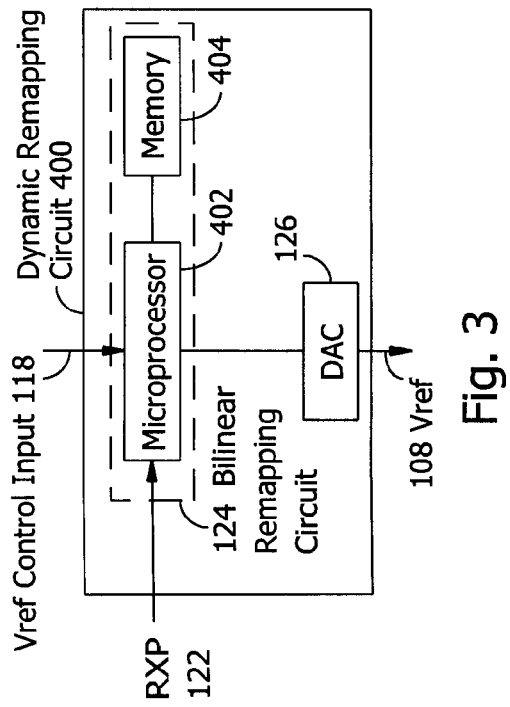
FIG. 4 is a block diagram of another example of a dynamic remapping circuit. The example of FIG. 4 comprises a microcontroller with an integral memory area and an integral DAC. In the example of FIG. 4, a bilinear remapping circuit comprises a central processing unit (CPU) and a memory area within the microcontroller.
Figure 5:
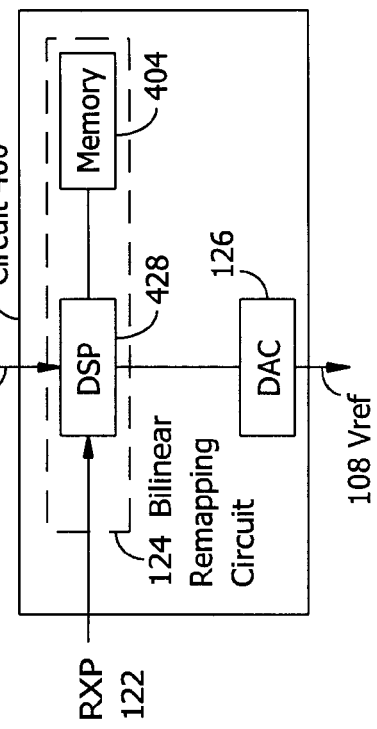
FIG. 5 is a block diagram of yet another example of a dynamic remapping circuit. The example of FIG. 5 comprises a customizable logic device in which a DAC and a bilinear remapping circuit comprising a CPU and a memory area are implemented.
Figure 6:
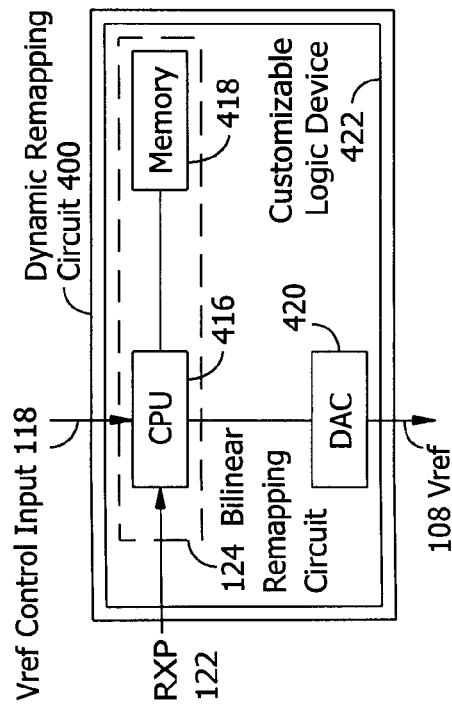
FIG. 6 is a block diagram of a refinement of the dynamic remapping circuit of FIG. 3 in which a DSP is substituted for the microprocessor.
Figure 7:
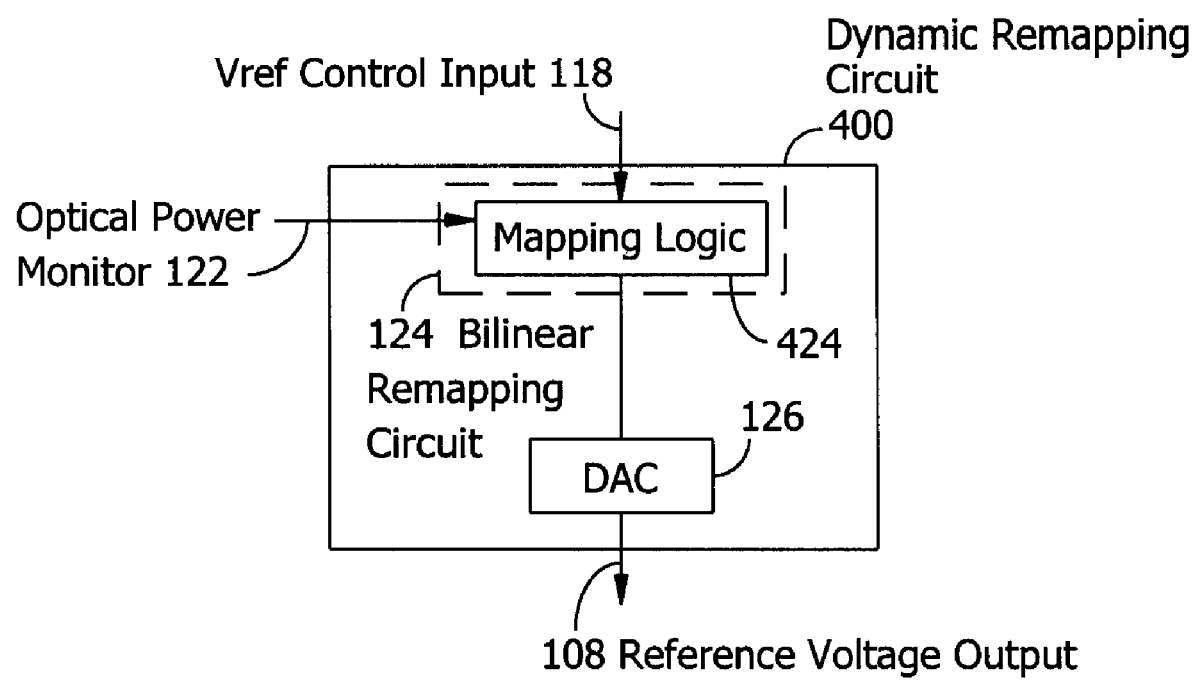
FIG. 7 is a block diagram of an example of a dynamic remapping circuit comprising a DAC and a bilinear remapping circuit having mapping logic for implementing a bilinear mapping relationship without a device for executing software instructions.

FIG. 3 shows a dynamic remapping circuit 400 comprising a microprocessor 402 electrically connected to a memory 404 for storing remapping instructions, remapping parameters, input data, intermediate calculation results, and other data and having an output electrically connected to an input of a DAC 126. FIG. 4 shows another example of a dynamic remapping circuit 400 comprising a microcontroller 408. The microcontroller 408 includes a CPU 410 able to exchange data and remapping instructions with a memory area 412. An output of the CPU 410 is connected electrically to an input of a DAC 414 included in the microcontroller 408. FIG. 5 illustrates another alternative embodiment of a dynamic remapping circuit 400 comprising a customizable logic device 422 in which a CPU 416, a memory area 418, and a DAC 420 are implemented by suitable combinations of logic elements in the customizable logic device 422. Examples of a customizable logic device 422 include, but are not limited to, a gate array, a programmable logic device (PLD), a digital signal processor (DSP), and an application-specific integrated circuit (ASIC). Another dynamic remapping circuit example in FIG. 6 is similar to that of FIG. 3, except that a DSP 428 in FIG. 6 replaces the microprocessor 402 of FIG. 3.

In the embodiments of a dynamic remapping circuit in FIGS. 3-6, bilinear mapping is performed by remapping instructions retrieved from a memory device and executed in a device for executing software instructions in a bilinear remapping circuit. A plurality of storage locations in the dynamic remapping circuit 400 store remapping instructions and values related to constants "a", "b", and "c", Vdtc, Vref, and other parameters and calculation results. For example, FIG. 1 shows a storage location "a" 128 for bilinear remapping constant "a", a storage location "b" 130 for bilinear remapping constant "b", and a storage location "c" 132 for bilinear remapping constant "c" as part of the bilinear remapping circuit 124 in the dynamic remapping circuit 400. As shown in FIGS. 3-6, a bilinear remapping circuit optionally includes a device for executing software instructions such as, but not limited to, a microprocessor and associated memory, a microcontroller, a customizable logic device with integral CPU and memory, or a DSP and associated memory. Or, a bilinear mapping circuit may optionally include a dedicated logic circuit for performing remapping without a device for executing software instructions, as in the example of FIG. 7 where bilinear remapping of RXP and Vdtc with constants "a", "b", and "c" is performed by mapping logic 424.

A DAC is shown in each of the examples of a dynamic remapping circuit in FIGS. 3-7. In some embodiments, a dynamic remapping circuit includes a DAC with 10 bits of resolution. Any of the DACS in FIGS. 3-7 may optionally be selected from commercially available devices employing one of several alternative conversion methods familiar to one skilled in the art, and may optionally be selected to output data having other than 10 bits of resolution.

The bilinear remapping circuit 124 in the examples of FIGS. 3-7 performs a bilinear mapping of Vdtc and RXP to Vref according to the relationship expressed in equation (2):

$$Vref = (a \times Vdtc \times (RXP + b)) + c \qquad (2)$$

where "a", "b", and "c" are the bilinear remapping constants. As shown by equation (2), a value for Vref is determined by multiplying the sum of RXP and constant "b" by Vdtc to form a first product, multiplying the first product by constant "a" to form a second product, and adding constant "c" to the second product.

A communication system known in the art may achieve a minimum BER when the OSNR and RXP of an optical data signal are constant or nearly constant, but may fail to achieve minimum BER when OSNR or RXP change rapidly or by large amounts. A communication system in which an embodiment of the invention is operating achieves a minimum BER not only when OSNR and RXP are stable, but also when OSNR and RXP are varying intermittently or continuously. Embodiments of the invention achieve minimum BER even after the OSNR or RXP (or both) undergo a large, rapid change in magnitude, resulting in new values of Vdtc_opt that may be substantially different from previously determined values.

Bilinear remapping constants "a", "b", and "c" in equation (2) affect the alignment of Vdtc_opt points for a related family of curves corresponding to BER as a function of Vdtc at different values for OSNR and RXP. Constant "b" in equation (2) adjusts the span of a curve at a selected value of BER, for example the span at the BER threshold value. Constant "b" also provides for a minimum curve gradient to facilitate searching for a minimum BER when the optical power of the optical data signal is small. Constants "a" and "c" in equation (2) shift the curves in a direction parallel to the Vdtc axis so as to align the Vdtc_opt point for each curve along a selected line of constant Vdtc. The value of Vdtc along a selected line of constant Vdtc is referred to as Vdtc_norm. A value of Vdtc_norm may optionally be output from a transponder 100.

Figure 8:
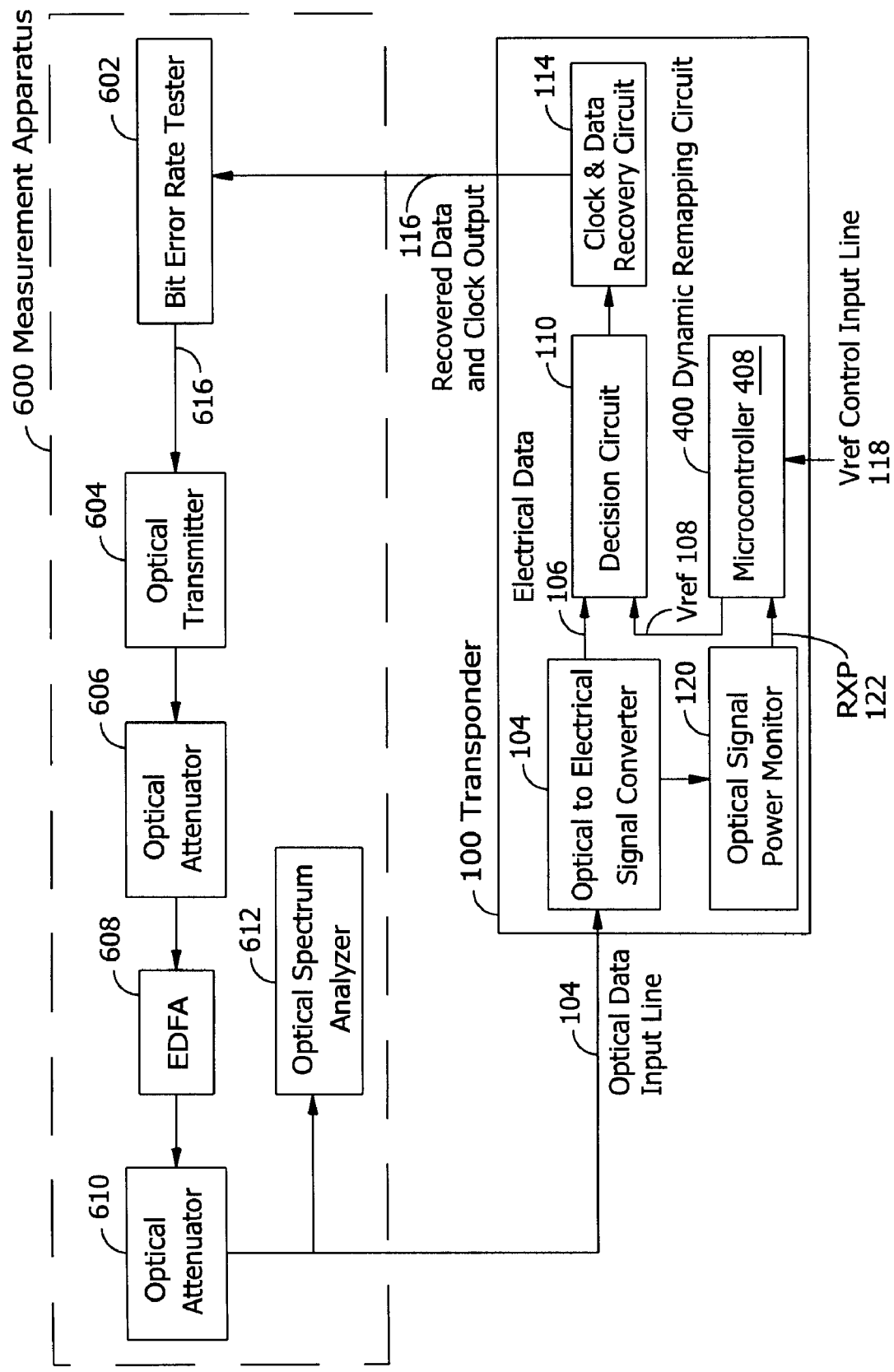
FIG. 8 is a block diagram of an example of a measurement apparatus for determining the values of the bilinear remapping constants "a", "b", and "c" for the transponder of FIG. 1.

Bilinear remapping constants "a", "b", and "c" are determined from measurements of BER made for different sets of values of Vref, OSNR, and RXP. Such measurements may optionally be made for, and the resulting values of "a", "b", and "c" stored in, a related group of transponders, for example a group of transponders from one production lot. An example of a measurement apparatus for collecting data used for determining values of constants "a", "b", and "c" to be used in an embodiment of the invention is shown in FIG. 8. The measurement apparatus 600 of FIG. 8 comprises a bit error rate tester 602 having a test data output line 616 carrying a digital electrical signal representing test data connected to an input of an optical transmitter 604. The optical transmitter 604 converts the digital electrical signal to a corresponding optical signal which is optically coupled on an output of the optical transmitter 604 to an optical input of a first optical attenuator 606. The first optical attenuator 606 attenuates the optical signal to a selected value of optical power and outputs the attenuated optical signal. The attenuated optical signal is optically coupled to an amplifier, which may optionally be of a type referred to as an EDFA as represented by the EDFA 608 in FIG. 8. The purpose of the EDFA 608 is to add a selected amount of gain and a selected maximum amount of noise to the optical signal. The amplified optical signal output of the EDFA 608 includes noise and is optically coupled to an input of a second optical attenuator 610. The combination of the first optical attenuator 606, EDFA 608, and second optical attenuator 610 causes a selected amount of degradation of the optical signal representing test data and simulates conditions which may be found in a fiber optic communications network.

An optical output of the second optical attenuator 610, comprising an optical signal degraded by selected amounts of attenuation and noise, is coupled to an optical input of the receiver section of an optical transponder 100 for which constants "a", "b", and "c" are to be determined and in which the constants will be stored after measurements are completed. In the example of FIG. 8, a signal corresponding to a selected value of Vdtc is input to the transponder 100 on a Vref control input line 118. For purposes of determining constants "a", "b", and "c", Vref is mapped from a selected value of Vdtc according to the linear relationship of equation (1). A clock and data recovery circuit output line 116 from the transponder 100, comprising digital data recovered from the optical signal comprising test data, is electrically connected to an input of the bit error rate tester 602, which compares data received from the transponder to data sent to the transponder to determine a value of BER.

Figure 9:
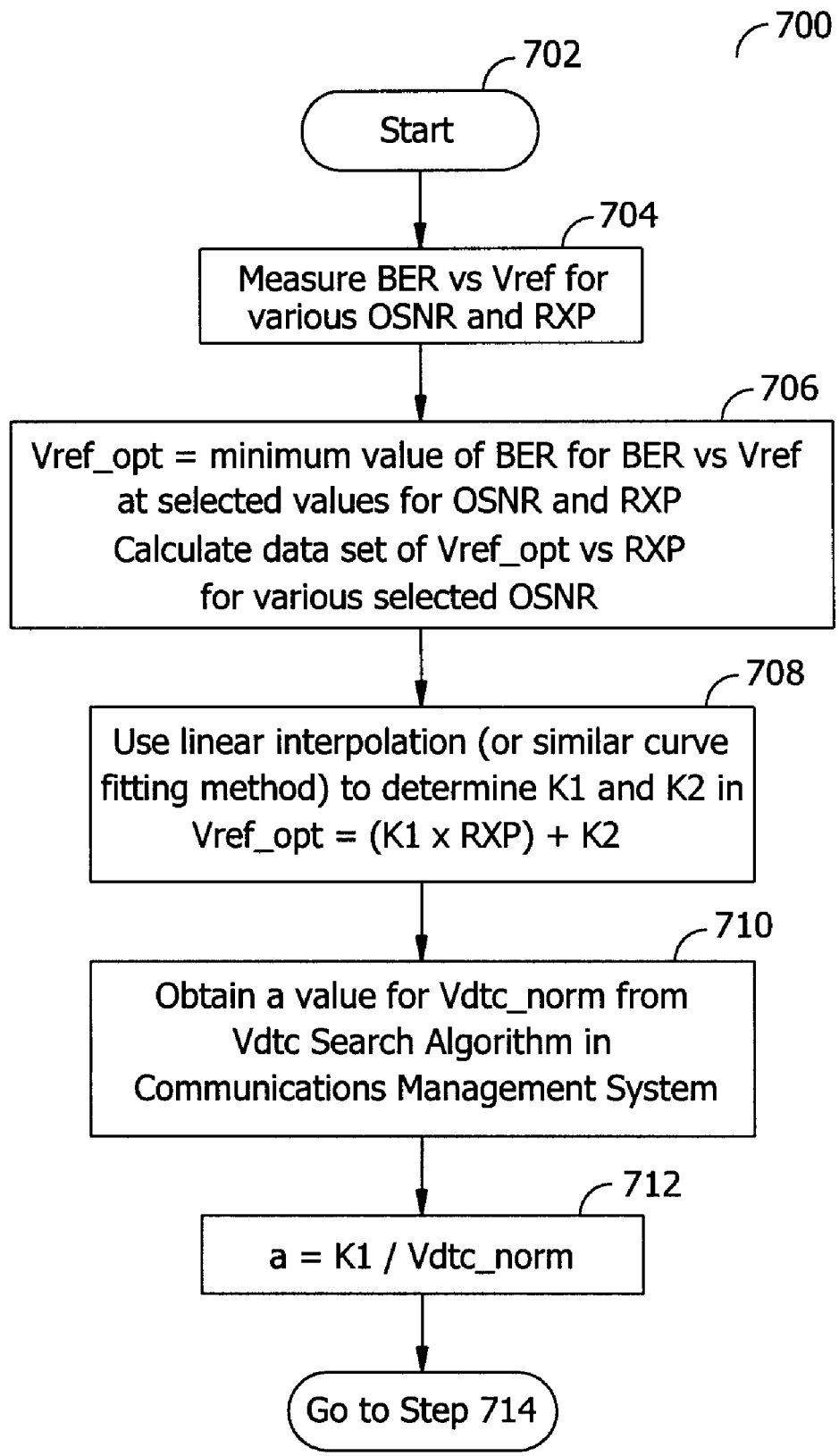
FIG. 9 is a flow chart illustrating a first part of a method for determining values for the bilinear remapping constants "a", "b", and "c".
Figure 10:
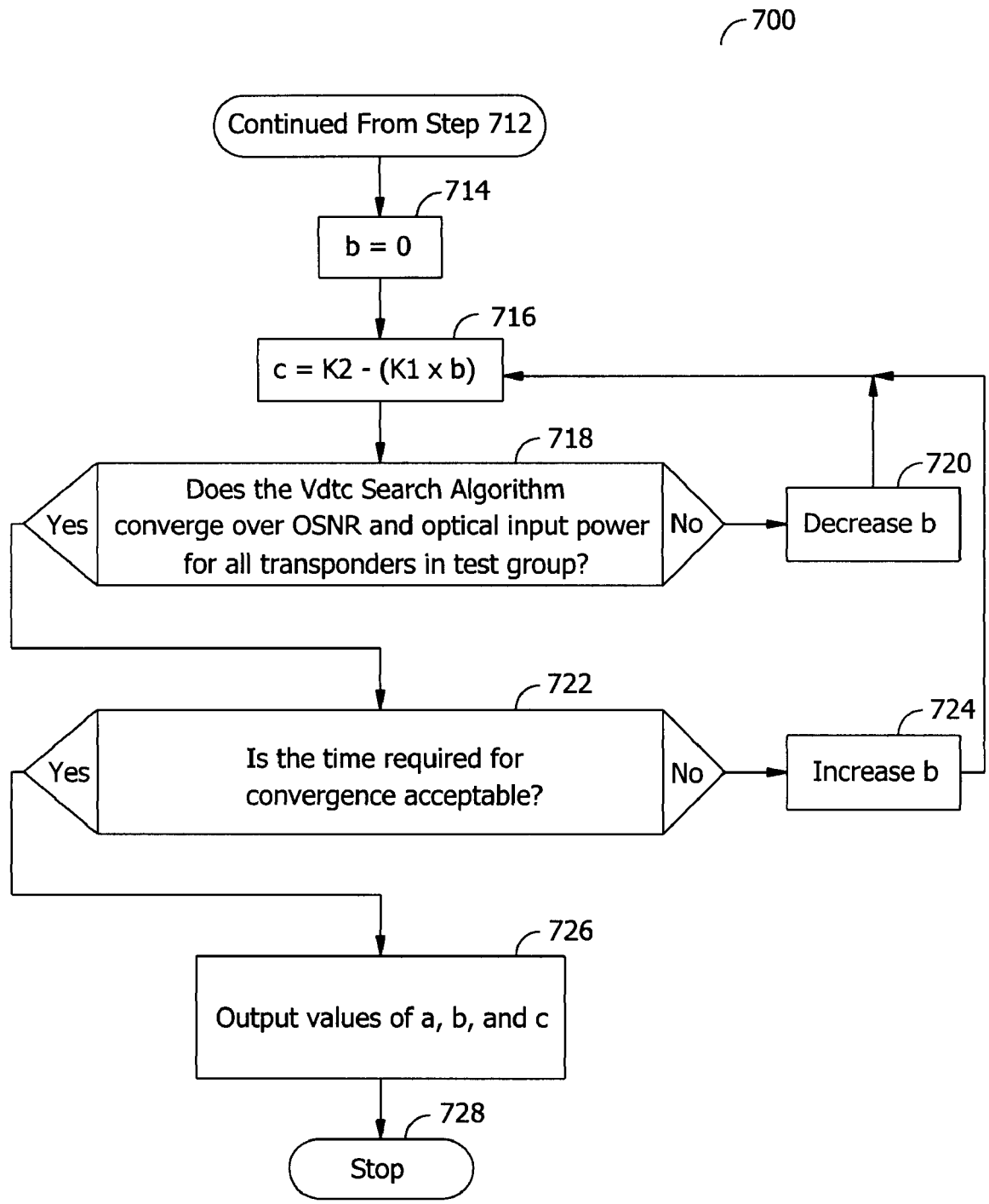
FIG. 10 is a flow chart showing a second part of the method of FIG. 9.
Figure 11:
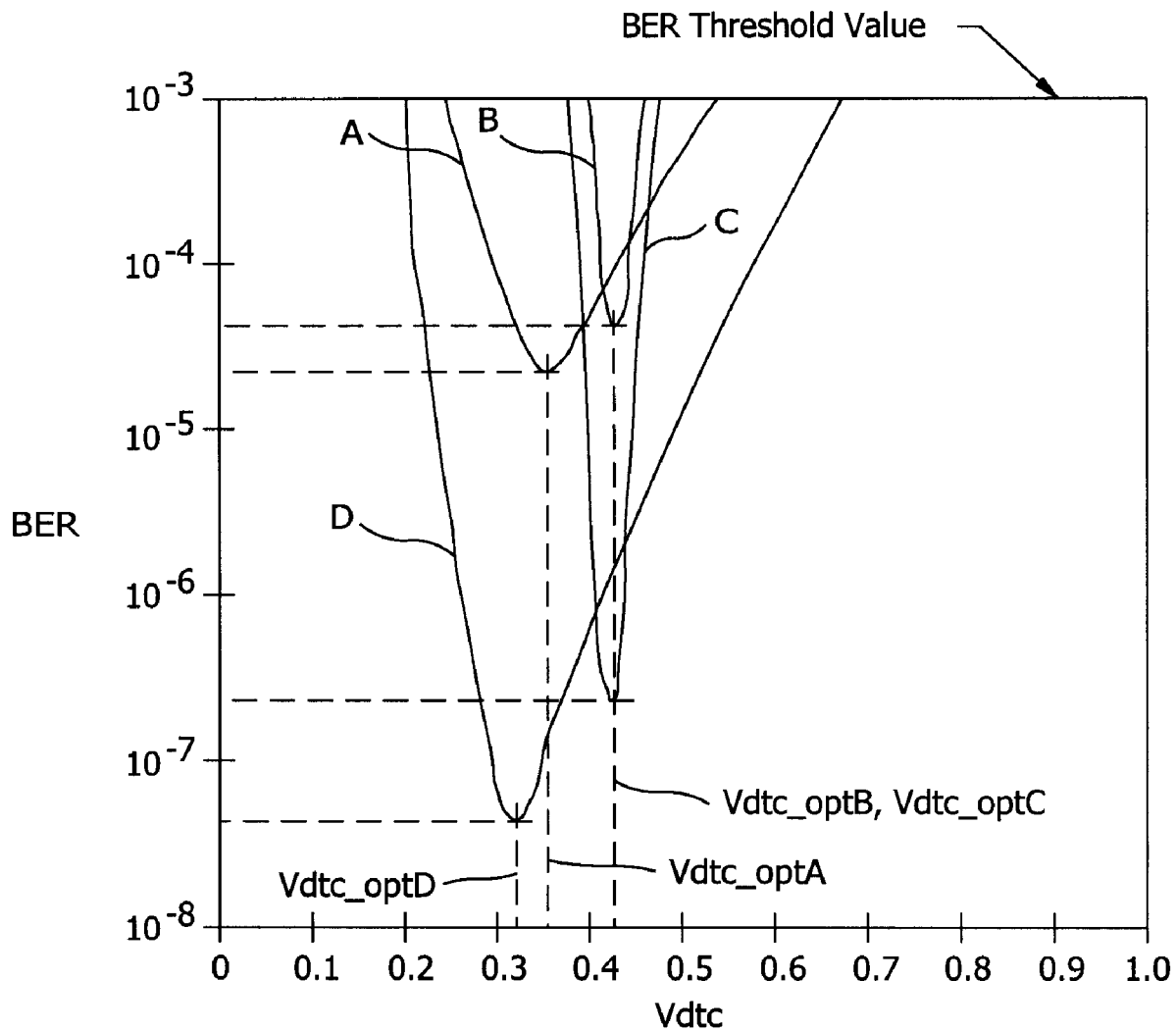
FIG. 11 is a graph of Vdtc versus BER for four different combinations of OSNR and RXP measured from an optical data signal for a communication system known in the art. Each curve in FIG. 11 is related to a selected pair of values of RXP and OSNR.

An example of a procedure for determining the values of the bilinear remapping constants "a", "b", and "c" with the measurement apparatus example of FIG. 8 is shown in the flowchart of FIG. 9 and FIG. 10. Referring to FIG. 9, a procedure 700 for determining constants "a", "b", and "c" begins with step 702 and proceeds to step 704 for forming data sets comprising (Vref, BER) data points measured for a plurality of selected combinations of OSNR and RXP. Next, in step 706 a value of Vref_opt is located at a point corresponding to minimum BER in each data set of (Vref, BER) data points relating to one combination of OSNR and RXP values. A new data set comprising a plurality of Vref_opt values and corresponding RXP values is formed.

In step 708 of FIG. 9, a curve is mathematically fit to the data set comprising (Vref_opt, RXP) data points from step 706. The curve mathematically fit to the data set may optionally be a line of best fit described by equation (3):

$$Vref\_opt = K1 \times RXP + K2 \qquad (3)$$

where K1 and K2 are mathematical constants whose values are adjusted to fit a line to the data set. A line of best fit may be fit to the data set by linear interpolation or other curve fitting methods familiar to one skilled in the art.

In step 710 of FIG. 9, a value of Vdtc_norm is obtained from an external source, for example a Vdtc search algorithm operating in a communications management system. Optionally, a value of Vdtc_norm determined in a previous execution of the method 700 for determining a, b, and c may be used as a starting point for the next execution of the method. Then, in step 712 a value for constant "a" is determined from equation (4):

$$a = K1/Vdtc\_norm \qquad (4)$$

After a value for the constant "a" is calculated in step 712 of FIG. 9, the procedure continues with step 714 in FIG. 20. In step 714 of FIG. 20, an iterative process for determining values for constants "b" and "c" begins by initializing constant "b" to zero. Next, in step 716 a value for constant "c" is calculated from equation (5).

$$c = K2 - K1 \times b \qquad (5)$$

In step 718, a value of Vref is calculated according to equation (2) and the resulting Vref is used to test convergence of a Vdtc search algorithm for various selected values of OSNR and RXP, for each of the transponders in a group of transponders to be tested. If the Vdtc search algorithm fails, the value of constant "b" is reduced by a selected amount, as shown in step 720, and the process returns to step 716 to determine a new value for constant "c". If instead the Vdtc search algorithm converges successfully for all selected values of RXP and OSNR, the process continues with step 722 to compare a measured value of time duration for convergence to be completed to a selected maximum value of time duration. If the measured time duration is greater than the selected maximum time duration, that is, convergence speed is slower than preferred, constant "b" is increased by a selected amount as shown in step 724 and the iterative process returns to step 716 where a new value of "c" is calculated. If instead the measured time duration for convergence is less than or equal to the selected maximum time, that is, convergence speed is acceptable, then the values of "a", "b", and "c" calculated by the procedure 700 are ready for use by an embodiment of the invention in performing the remapping described by equation (2). The procedure therefore outputs the values of the constants "a", "b", and "c" in step 726 and the procedure ends at step 728. Values related to the constants "a", "b", and "c" are then incorporated into a dynamic remapping circuit in an embodiment of the invention, for example by storing digital values in a memory in a dynamic remapping circuit 400 for a transponder 100 as in FIGS. 3-6.

An embodiment of the invention using values of the constants "a", "b", and "c" determined by the procedure 700 in FIG. 9 and FIG. 10 will cause data sets comprising (Vdtc, BER) data pairs at selected OSNR and RXP values to be offset and scaled so that Vdtc_opt points will be normalized to be approximately equal to a selected Vdtc_norm value. For a transponder operating with bilinear remapping constants "a", "b", and "c" determined by the procedure of FIG. 9 and FIG. 10, Vdtc_norm corresponds to the numerical value of Vref calculated with equation (2). Referring to the example of FIG. 1, a signal corresponding to the calculated Vref is output from the bilinear remapping circuit 125 on an output line 136 to an input of the DAC 126, which converts the signal corresponding to Vdtc to an analog voltage carried on the reference voltage line 108.

Figure 12:
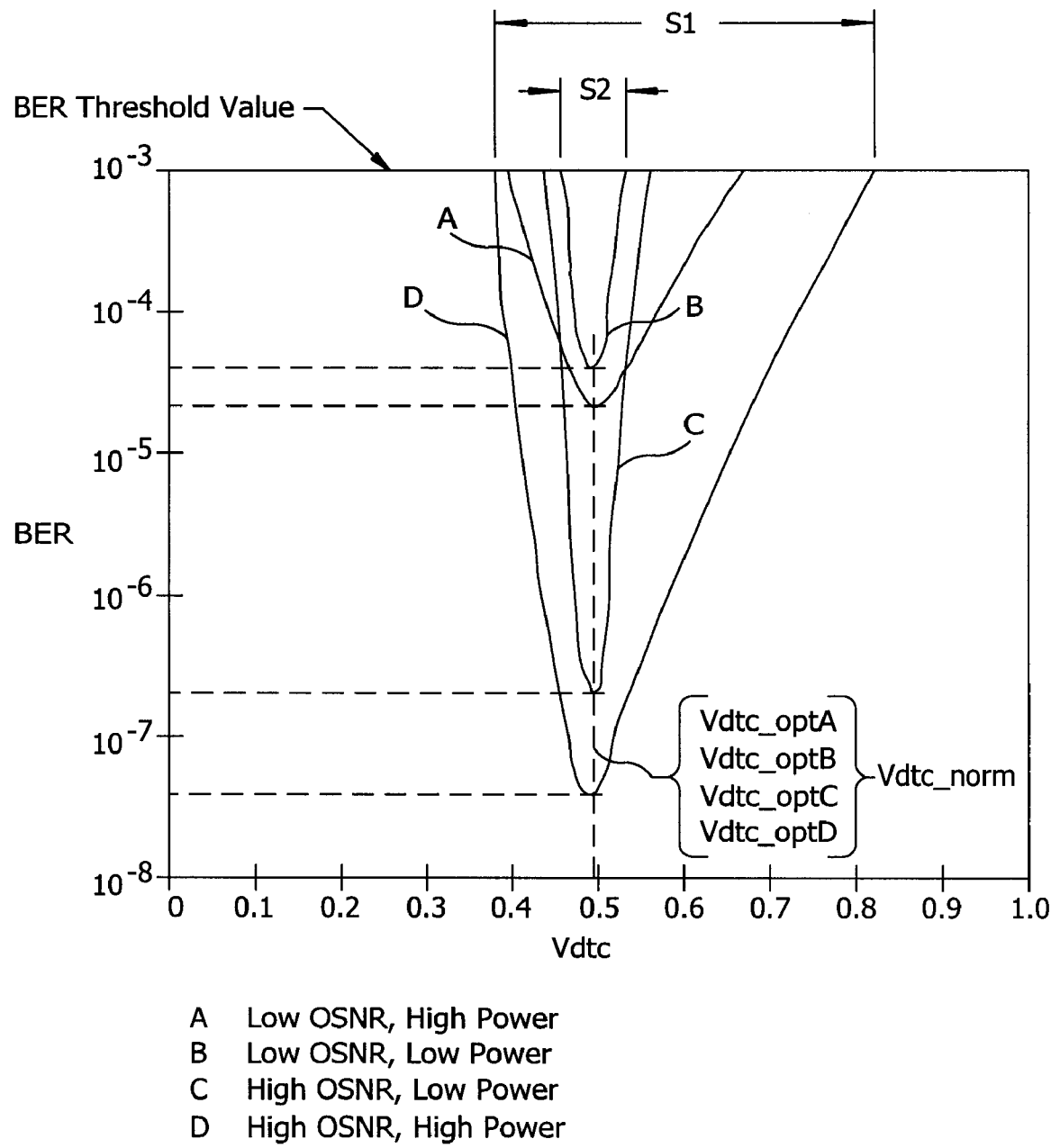
FIG. 12 is a graph of Vdtc versus BER for four different combinations of OSNR and RXP for a transponder in accord with an embodiment of the invention, one curve for each pair of OSNR and RXP values.

Curves representing a plot of (Vdtc, BER) data for different combinations of RXP and OSNR measured from an embodiment of the invention are shown in FIG. 12. In FIG. 12, curve A is related to an optical signal having low OSNR and high RXP, curve B relates to low OSNR and low RXP, curve C relates to high OSNR and low RXP, and curve D relates to high OSNR and high RXP. The four Vdtc_opt values corresponding to minimum BER for each curve, labeled Vdtc_optA, Vdtc_optB, Vdtc_optC, and Vdtc_optD respectively, are closely aligned to, i.e. normalized to, a line of constant Vdtc equal to Vdtc_norm. A span of each curve measured at a BER threshold value falls within a selected range from the smallest span marked S2 for curve B to the largest span marked S1 for curve D. Sensitivity of BER to changes in Vdtc will correspondingly fall in a range from a lower limit having a value related to S1 to an upper limit having a value related to S2. Convergence time for a Vdtc search algorithm will also fall within selected limits, a lower limit of convergence time related to S1 and an upper limit of convergence time related to S2. A communication system comprising an embodiment of the invention will therefore operate at an optimally low BER even with continuous changes in the optical power and optical signal to noise ratio of an optical data signal.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, or use of equivalent functional steps for steps described herein. Such insubstantial variations are to be considered within the scope of what is contemplated here. Moreover, if plural examples are given for specific means, or steps, and extrapolation between or beyond such given examples is obvious in view of the present disclosure, then the disclosure is to be deemed as effectively disclosing and thus covering at least such extrapolations.

What is claimed is:

1. A transponder for sending and receiving an optical data signal over a fiber optic network, comprising:
a reference voltage control input line;
an optical power monitor line; and
a dynamic remapping circuit electrically connected to said reference voltage control input line and to said optical power monitor line, wherein said dynamic remapping circuit is configured to output a reference voltage determined by a bilinear remapping of a numerical value carried on said reference voltage control input line and a numerical value carried on said optical power monitor line.

2. The transponder for sending and receiving an optical data signal over a fiber optic network of claim 1, further comprising:
a reference voltage output line; and
said dynamic remapping circuit comprising:
a bilinear remapping circuit electrically connected to said reference voltage control input line and said optical power monitor line; and
a digital to analog converter electrically connected to said bilinear remapping circuit and said reference voltage output line.

3. The transponder for sending and receiving an optical data signal over a fiber optic network of claim 2, wherein said bilinear remapping circuit further comprises:
a first storage location for a bilinear remapping constant "a";
a second first storage location for a bilinear remapping constant "b"; and
a third storage location for a bilinear remapping constant "c",
wherein said bilinear remapping circuit is configured to output a reference voltage determined by a bilinear remapping of a numerical value carried on said reference voltage control input line, a numerical value carried on said optical power monitor line, and numerical values from said first, second, and third storage locations.

4. The transponder for sending and receiving an optical data signal over a fiber optic network of claim 3, wherein said dynamic remapping circuit is configured to output an optimized reference voltage on said reference voltage output line following a change in a measured value of optical signal to noise ratio for the optical data signal.

5. The transponder for sending and receiving an optical data signal over a fiber optic network of claim 3, wherein said dynamic remapping circuit is configured to output an optimized reference voltage on said reference voltage output line following a change in a measured value of optical power of the optical data signal.

6. The transponder for sending and receiving an optical data signal over a fiber optic network of claim 3, further comprising:
a first selected numerical value in said first storage location;
a second selected numerical value in said second storage location; and
a third selected numerical value in said third storage location,
wherein said first numerical value, said second numerical value, and said third numerical value are selected to cause a bilinear remapping resulting in a minimum value of bit error rate in a data signal output by the transponder.

7. The transponder for sending and receiving an optical data signal over a fiber optic network of claim 3, wherein
a numerical value carried by said optical power monitor line corresponds to the optical power of the optical data signal RXP,
a numerical value carried by said reference voltage control line corresponds to a decision threshold voltage Vdtc,
and whereby a numerical value of a reference voltage Vref is determined from the equation:

$$Vref = (a \times Vdtc \times (RXP + b)) + c.$$

8. The transponder for sending and receiving an optical data signal over a fiber optic network of claim 7, further comprising a selected threshold value of bit error rate, wherein said first, second, and third numerical values are selected to limit a measured value of bit error rate to be less than or equal to said threshold value of bit error rate.

9. The transponder for sending and receiving an optical data signal over a fiber optic network of claim 7, wherein said first, second, and third numerical values are selected to cause a search algorithm to converge to an optimum value of decision threshold voltage.

10. The transponder for sending and receiving an optical data signal over a fiber optic network of claim 7, wherein said dynamic remapping circuit is configured to output an optimized reference voltage corresponding to a minimum bit error rate in a data signal output from the transponder during continuous changes in the optical power of the optical data signal.

11. The transponder for sending and receiving an optical data signal over a fiber optic network of claim 7, wherein said dynamic remapping circuit is configured to output an optimized reference voltage corresponding to a minimum bit error rate in a data signal output from the transponder during continuous changes in the optical signal to noise ratio of the optical data signal.

12. The transponder for sending and receiving an optical data signal over a fiber optic network of claim 7, wherein said bilinear remapping circuit further comprises a microprocessor electrically connected to said reference voltage control input line and a memory device electrically connected to said microprocessor, and said memory device includes said first, second, and third storage locations.

13. The transponder for sending and receiving an optical data signal over a fiber optic network of claim 7, wherein said bilinear remapping circuit further comprises a microcontroller electrically connected to said reference voltage control input line and said microcontroller includes said first, second, and third storage locations.

14. The transponder for sending and receiving an optical data signal over a fiber optic network of claim 7, wherein said bilinear remapping circuit further comprises a digital signal processor electrically connected to said reference voltage control input line and a memory device electrically connected to said digital signal processor, and said memory device includes said first, second, and third storage locations.

15. The transponder for sending and receiving an optical data signal over a fiber optic network of claim 7, wherein said bilinear remapping circuit further comprises a customizable logic device electrically connected to said reference voltage control input line, and said customizable device includes said first, second, and third storage locations.

16. The transponder for sending and receiving an optical data signal over a fiber optic network of claim 7, wherein said dynamic remapping circuit is adapted to output a magnitude of said reference voltage corresponding to a normalized value of decision threshold voltage.

* * * * *